United States Patent
Kim (10) Patent No.: US 9,417,715 B2
(45) Date of Patent: Aug. 16, 2016

(54) SMART MOUSE DEVICE HAVING AN OPTICAL SENSOR AND A PRESSURE SENSOR

(71) Applicant: Gi Young Kim, Mokpo-Si (KR)

(72) Inventor: Gi Young Kim, Mokpo-Si (KR)

( * ) Notice: Subject to any disclaimer, the term of this patent is extended or adjusted under 35 U.S.C. 154(b) by 0 days.

(21) Appl. No.: 14/409,484

(22) PCT Filed: Jun. 20, 2013

(86) PCT No.: PCT/KR2013/005450
§ 371 (c)(1),
(2) Date: Dec. 19, 2014

(87) PCT Pub. No.: WO2014/003359
PCT Pub. Date: Jan. 3, 2014

(65) Prior Publication Data
US 2015/0169087 A1  Jun. 18, 2015

(30) Foreign Application Priority Data

Jun. 29, 2012  (KR) ........................ 10-2012-0070956

(51) Int. Cl.
*G06F 3/0354* (2013.01)
*G06F 3/038* (2013.01)
*G06F 1/16* (2006.01)

(52) U.S. Cl.
CPC .......... *G06F 3/03543* (2013.01); *G06F 1/1626* (2013.01); *G06F 1/1632* (2013.01); *G06F 3/0383* (2013.01)

(58) Field of Classification Search
None
See application file for complete search history.

(56) References Cited

U.S. PATENT DOCUMENTS

| 2007/0202914 A1* | 8/2007 | Maaloe | G06F 1/1616 455/550.1 |
| 2012/0092253 A1* | 4/2012 | Irani | G06F 1/1692 345/157 |

FOREIGN PATENT DOCUMENTS

| JP | 2004-147272 A | 5/2004 |
| KR | 1020020086371 A | 11/2002 |
| KR | 1020070008293 A | 1/2007 |
| KR | 100943031 B1 | 2/2010 |

OTHER PUBLICATIONS

International Search Report; PCT/KR2013/005450; International Filing Date: Jun. 20, 2013; 3 pgs.

* cited by examiner

*Primary Examiner* — David D Davis
(74) *Attorney, Agent, or Firm* — Schmeiser, Olsen & Watts, LLP (57) ABSTRACT

A smart mouse device having an optical sensor and a pressure sensor is provided. The smart mouse device includes the optical sensor for outputting position data by using light emitted from and reflected off a light-emitting element, and the pressure sensor for outputting a pressure signal according to a pressing of the sensor. The smart mouse device also includes a controller for transmitting the position data and the pressure signal to a user terminal, and a user terminal connection unit which connects to the user terminal, and which transmits and receives data.

15 Claims, 7 Drawing Sheets

SMART MOUSE DEVICE HAVING AN OPTICAL SENSOR AND A PRESSURE SENSOR

CROSS-REFERENCE TO RELATED APPLICATIONS

This application claims priority to PCT Application No. PCT/KR2013/005450 having a filing date of Jun. 20, 2013, based off of KR 10-2012-0070956 having a filing date of Jun. 29, 2012, the entire contents of which are hereby incorporated by reference.

FIELD OF TECHNOLOGY

The present invention relates to a smart mouse device and, more particularly, to a smart mouse device that can be used in various types of mouse devices through use of an optical sensor and a pressure sensor.

BACKGROUND

Existing mouse devices can employ only fragmentary communication standards. These mouse devices must use a dedicated receiver or can use only one communication method among Bluetooth, universal serial bus (USB) and Wi-Fi to connect with a computer. Moreover, existing mouse devices have little or no change from early mouse functions such as a wheel function, a page turning function, and the like, and are limited to simple operations.

With recent development of mouse functions, a touch mouse device has been developed. However, a typical touch mouse device must be provided with a touch pad at an upper end thereof, thereby causing price increase and making it difficult to realize.

SUMMARY

An aspect relates to a smart mouse device that can be used in various types of mouse devices.

In accordance with one aspect of the present invention, a smart mouse device includes: an optical sensor outputting position data based on light emitted from a light emitting diode and reflected; a pressure sensor outputting a pressure signal when a user terminal is pressed; a controller transmitting the position data and the pressure signal to the user terminal; and a user terminal connection unit connected to the user terminal to exchange data with the user terminal.

In another embodiment of the present invention, the user terminal connection unit may have an on-the-go (OTG) function.

In a further embodiment of the present invention, the smart mouse device may further include a device connection unit connected to a computer terminal to exchange data with the external terminal. The controller may transmit the position data and the pressure signal to the user terminal and the computer terminal through the user terminal connection unit and the device connection unit, or may relay communication between the user terminal and the computer terminal.

In yet another embodiment of the present invention, the device connection unit may be connected to a charger, or a device capable of exchanging data with the user terminal through the controller. The position data and the pressure signal transmitted to the user terminal may be transmitted from the user terminal to the computer terminal together with mouse signals generated from the user terminal, and the mouse signals generated from the user terminal may be generated by a button and a touchscreen of the user terminal.

According to embodiments of the present invention, a wireless mouse device or a smart mouse device may be used through a user terminal without a wireless mouse transceiver, and may be connected to a computer to allow use of a basic mouse device or a touch mouse device, in which various communication channels of a user terminal may be used. In addition, according to embodiments of the present invention, the user terminal may be used to achieve various functions, thereby enabling convenient and efficient use of a smart mouse device. Further, a mouse device used as a unidirectional input device of unidirectionally transmitting data to the computer may be used as an interactive input/output device for exchanging data with the computer and other devices.

BRIEF DESCRIPTION

Some of the embodiments will be described in detail, with reference to the following figures, wherein like designations denote like members, wherein.

DETAILED DESCRIPTION

Prior to description of the embodiments of the present invention, summary of technical solutions or key points of the technical idea will first be presented.

A smart mouse device according to one embodiment of the invention includes an optical sensor outputting position data based on light emitted from a light emitting element and reflected, a pressure sensor outputting a pressure signal when pressed; a controller transmitting the position data and the pressure signal to a user terminal; and a user terminal connection unit connected to the user terminal to transmit and receive data.

Hereinafter, embodiments of the present invention that can be easily embodied by those skilled in the art will be described in detail with reference to the accompanying drawings. However, it will be appreciated by a person having ordinary skill in the art that these embodiments are given by way of illustration only and do not limit embodiments of the present invention.

Features of embodiments of the present invention for solving the foregoing technical problems will be described in detail with reference to the accompanying drawings based on exemplary embodiments of the present invention, in which like components will be denoted by like numerals throughout the specification and the accompanying drawings and thus components shown in different drawings may also be referred to in description with reference to a certain drawing, as needed. In addition, detailed descriptions of publicly known functions, configuration and other matters apparent to those skilled in the art will be omitted for clarity in description of operating principles of embodiments of the present invention.

Figure 1:
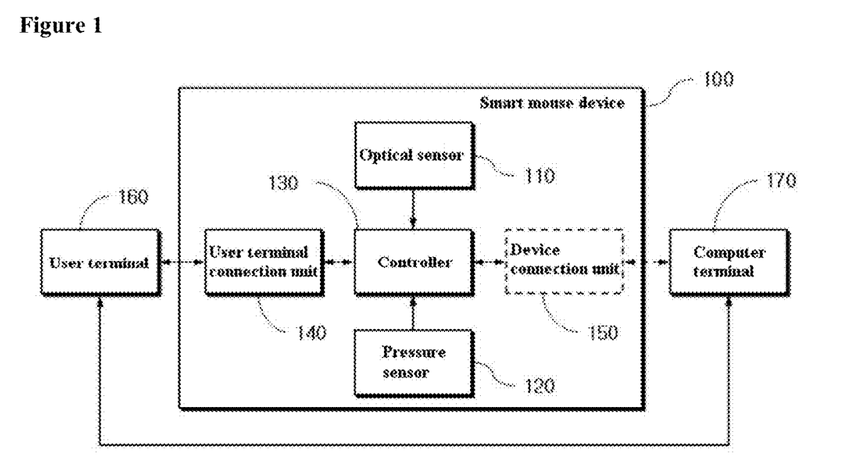
FIG. 1 is a block diagram of a smart mouse device according to one embodiment of the present invention.

FIG. 1 is a block diagram of a smart mouse device according to one embodiment of the present invention.

A smart mouse device 100 according to one embodiment of the invention includes an optical sensor 110, a pressure sensor 120, and a user terminal connection unit 140, and may further include a device connection unit 150. The smart mouse device 100 according to this embodiment may be used as a wireless mouse device through connection with a user terminal 160 including a smartphone, as a touch mouse device using a touchscreen of the user terminal, and as a smart mouse device for additionally implementing various functions of the user terminal 160. Further, the smart mouse device 100 according to this embodiment may be used as a mouse device without the user terminal 160 through direct connection with a computer terminal 170 or using a wireless mouse transceiver. That is, a single smart mouse device according to the embodiment of the invention may serve as various mouse devices as needed.

The optical sensor 110 outputs position data based on light emitted from a light emitting diode and reflected.

In more detail, the optical sensor 110 serves as an optical sensor for an optical mouse device that outputs the position data based on light emitted from the light emitting diode and reflected. The user terminal 160 may be a mobile terminal such as a smartphone. Since the user terminal 160 has no optical sensor, there is a hardware limit in use of the user terminal 160 as a mouse device. To overcome this limit, the optical sensor 110 serves as the optical sensor for the optical mouse device. The light emitting diode may emit various kinds of light such as visible light, laser light, a blue track, a dark field, and the optical sensor 110 can sense the light from the light emitting diode. The optical sensor 110 outputs the position data based on a direction of light emitted from the light emitting diode and reflected. The position data corresponds to a moving direction and speed of a mouse cursor.

The pressure sensor 120 outputs a pressure signal based on pressing.

In more detail, the pressure sensor 120 outputs the pressure signal depending upon whether the mouse device is pressed and a critical value of the pressure. The pressure sensor outputs the pressure signal when sensing a pressure higher than or equal to a preset critical value, and the pressure signal may be used to determine whether a mouse signal is generated from the user terminal. Based on the pressure signal, it is possible to determine whether a user clicks the touchscreen of the user terminal 160 or places a hand on the touchscreen without any intention to input a mouse signal. A minimum pressure for generating a mouse signal by touching or clicking the user terminal 160 is set to the critical value. Thus, it may be determined that the mouse signal is generated only when a pressure higher than or equal to the critical value is sensed. When the user terminal includes no pressure sensor, it is possible to prevent an input error, which can occur when a user places the hand on the user terminal 160 without any intention to input a mouse signal.

Further, the pressure sensor 120 may serve as a click button for the mouse device, or a touch pad of the touch mouse device. The pressure sensor 120 may be a pressure detection sensor or button. The pressure sensor 120 may employ a button corresponding to a click button of a typical mouse device, or a pressure detection sensor to generate a pressure signal when pressed. Further, the pressure sensor 120 may generate a scroll signal. The pressure sensor 120 may employ at least one pressure detection sensor or button. The pressure detection sensor or button may generate signals corresponding to a right click, a left click, a scroll, and the like of the mouse device. In addition, the pressure detection sensor or button may generate a shortcut key signal for copying, page turning, and the like.

The controller 130 transmits the position data and the pressing signal to the user terminal.

More specifically, in order to transmit the position data and the mouse signal output from the optical sensor 110 and the pressure sensor 120 corresponding to signals output from the existing mouse device to the computer terminal 170, the controller 130 transmits the position data and the pressure data to the connected user terminal 160.

The position data and the pressure signal transmitted to the user terminal 160 are transmitted to the computer terminal 170 together with the mouse signal generated from the user terminal 160. The mouse signal generated from the user terminal 160 may be generated by the touchscreen and the button. The user terminal 160 may be a smart terminal, and various communication channels such as Bluetooth, Wi-Fi, etc. usable in the user terminal 160 may be used to transmit the position data and the pressure signal to the computer terminal. Thus, the mouse device may be wirelessly used without a wireless mouse transceiver. The existing mouse devices need fragmentary communication standards. Further, a separate receiver is inconveniently required for a wireless mouse device. However, according to the embodiment of the invention, the communication channel of the user terminal 160 is used, so that various communication channels may be used without any separate receiver. Further, functions of the smart mouse device 100 may be extended through the touchscreen, button and various sensors of the user terminal 160. Thus, the smart mouse device 100 may perform not only a simple click, but also various functions such as input, editing, and the like. In addition, the smart mouse device 100 may be directly connected to the computer terminal 170 through the device connection unit 150, or transmit the position data and the pressure signal to the computer terminal 170 through the wireless mouse transceiver. If the smart mouse device 100 is not connected to the user terminal 160, the smart mouse device 100 operates like the existing mouse device. Among the communication channels, a wired communication channel has priority and automatic connection may be attempted in order of USB, Wi-Fi, Bluetooth, and other channels when the wired communication channel is disconnected.

In addition to the computer terminal 170, a terminal having a processor like a smart television (TV) and requiring a mouse operation may be connected to the smart mouse device 100.

The controller 130 may transmit the position data and the pressure signal to the user terminal 160 and the computer terminal 170 through the user terminal connection unit 140 and the device connection unit 150, or may relay communication between the user terminal 160 and the computer terminal 170. As mentioned above, the smart mouse device 100 may be used as a wireless mouse device through connection with the user terminal 160 via the user terminal connection unit 140, or may be used as a smart mouse device and a touch mouse device based on the functions of the user terminal 160. Further, the smart mouse device 100 may be used as the existing mouse device through connection with the computer terminal 170 via the device connection unit 150. In addition, the smart mouse device 100 may be used as a smart mouse device through connection with both the user terminal 160 and the computer terminal 170. When the smart mouse device 100 is connected to both the user terminal 160 and the computer terminal 170, the position data and the pressure signal may be directly transmitted to the computer terminal 170 without using the user terminal 160. Further, the smart mouse device 100 may be used as a relay for relaying various mouse functions of the user terminal 160 to the computer terminal 170.

When the user terminal connection unit 140 does not have an on-the-go (OTG) function, the controller 130 may offer the OTG function. That is, without any computer that serves as a host, the smart mouse device 100 may directly perform the mouse function through connection with the user terminal 160.

The user terminal connection unit 140 is connected to the user terminal 160, thereby allowing data to be transmitted and received therethrough.

More specifically, the position data and the pressure signal are transmitted to the user terminal 160 through the user terminal connection unit 140. When the smart mouse device 100 is connected to both the user terminal 160 and the computer terminal 170, data from the user terminal 160 may be received through the user terminal connection unit 140. The user terminal connection unit 140 may be achieved by a universal serial bus (USB). For a dedicated user terminal 160, the user terminal connection unit 140 may be achieved by a connection member to be connected to the dedicated user terminal 160.

The user terminal connection unit 140 may have the OTG function. With a USB OTG function of the user terminal connection unit 140, the smart mouse device 100 may be connected to the user terminal 160 to exchange data therewith without the computer. By the OTG function, the smart mouse device 100 may transmit and receive data to and from the user terminal 140 under conditions that the user terminal connection unit 140 is connected to the user terminal 140 and an external hard disk drive, a camera, or like is connected to the device connection unit 150.

The smart mouse device 100 may output a signal corresponding to one among a click, a mouse device wheel, a shortcut key, enlargement, reduction, cancel, and a predetermined command from the pressure sensor 120 and the button and the touchscreen of the user terminal 160. Thus, various mouse functions may be realized not only by the functions of the pressure sensor 120 but also by the button and the touchscreen of the user terminal 160.

More specifically, the pressure sensor 120 may sense pressure and generate a pressure signal, as described above. In addition, the button of the user terminal 160, a touchscreen of a display, and the like, may generate various mouse signals. The button of the user terminal 160 may generate a mouse signal or may be used as a shortcut key. Further, various functions may be defined through the touchscreen of the user terminal 160 to be realized. Such a variety of functions will be described in detail with reference to FIGS. 6a to 6e.

The device connection unit 150 is connected to the computer terminal 170 to transmit and receive data to and from the computer terminal 170.

More specifically, the device connection unit 150 transmits the position data and the pressure signal to the computer terminal 170. When the smart mouse device 100 is connected to both the user terminal 160 and the computer terminal 170, data of the user terminal 160 may be transmitted to the computer terminal 170. When the smart mouse device 100 is connected to the computer terminal 170 without connection with the user terminal 160, the smart mouse device 100 may be used to transmit the position data and the pressure signal to the computer terminal 170, i.e. as a mouse device.

The device connection unit 150 may be connected to a charger, or a device that transmits and receives data to and from the controller. The device connection unit 150 may be achieved by a USB. In addition to the computer terminal 170, the device connection unit 150 may be connected to the charger to charge a battery of the user terminal 160, or may be connected to other devices such as an external hard disk drive, a camera, and the like to exchange data with the devices. The smart mouse device 100 is connected to the user terminal 160 through the user terminal connection unit 140 and connected to other USB peripheral devices through the device connection unit 150, whereby the user terminal 160 and the USB peripheral devices can be directly connected to each other and exchange data without a computer. Besides the device connection unit 150, the smart mouse device 100 may additionally include connection units for connection with other peripheral devices. Configuration for connection with other devices will be described in detail with reference to FIG. 2.

Figure 2:
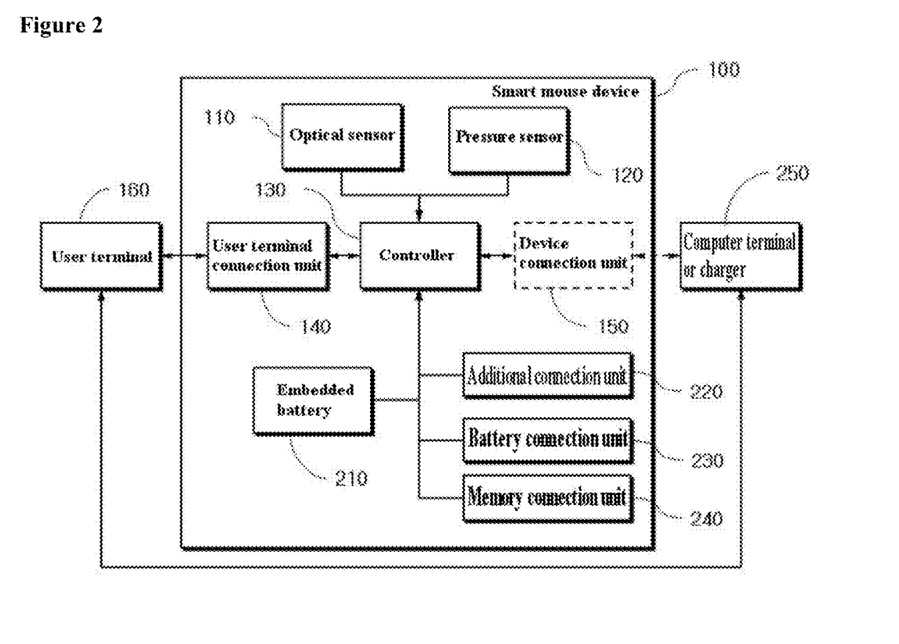
FIG. 2 is a block diagram of a smart mouse device according to another embodiment of the present invention.

FIG. 2 is a block diagram of a smart mouse device according to another embodiment of the present invention.

A smart mouse device according to this embodiment may further include an embedded battery 210, an additional connection unit 220, a battery connection unit 230, or a memory connection unit 240. The smart mouse device according to this embodiment may not only operate as a mouse device, but also may be additionally connected to other devices, thereby increasing battery capacity and enabling battery charging, communication with other devices, or connection of an external memory. The smart mouse device of FIG. 2 is realized through expansion of the functions of the smart mouse device of FIG. 1.

The embedded battery 210 is a battery that may be used as an emergency power source for a user terminal 160.

Specifically, the user terminal 160 is a mobile terminal such as a smart terminal, and requires a battery. Since a portable battery has limited capacity, the embedded battery of the smart mouse device may be used as an emergency power source when the battery of the user terminal 160 is dead. A device connection unit 150 may be connected to a computer terminal or charger 250. The embedded battery 210 is charged by connecting the device connection unit 150 to the charger.

Through the additional connection unit 220, a device that exchanges data with a controller 130 may be connected to the smart mouse device.

Specifically, the additional connection unit 220 allows additional devices connectable with the device connection unit 150 to be additionally connected to the smart mouse device. The additional device may include another computer terminal, an external hard disk drive, a camera, and the like. The additional connection unit 220 may be realized by a USB.

The battery of the user terminal 160 may be connected to the smart mouse device through the battery connection unit 230, through which an additional battery may be connected to the user terminal 160 such that the battery of the user terminal 160 can be increased in capacity or charged.

More specifically, an auxiliary battery may be connected to the user terminal 160 to increase battery capacity of the user terminal 160. Further, when the battery of the user terminal 160 is charged by connecting the charger to the device connection unit 150, the battery connected to the battery connection unit 230 may also be charged. The battery connection unit 230 may be realized by a connection member that may be connected to the battery of the user terminal 160.

The memory connection unit 240 allows connection with a memory.

More specifically, the memory is an external storage device that includes an external hard disk drive, a USB memory, and the like, which may be connected thereto through a USB. Alternatively, a memory having a dedicated connection unit like a secure digital (SD) card may also be used. The memory connection unit 240 may be realized by a slot and the like, to which the SD card may be connected, thereby enabling connection with other memories to exchange data therewith.

Figure 3:
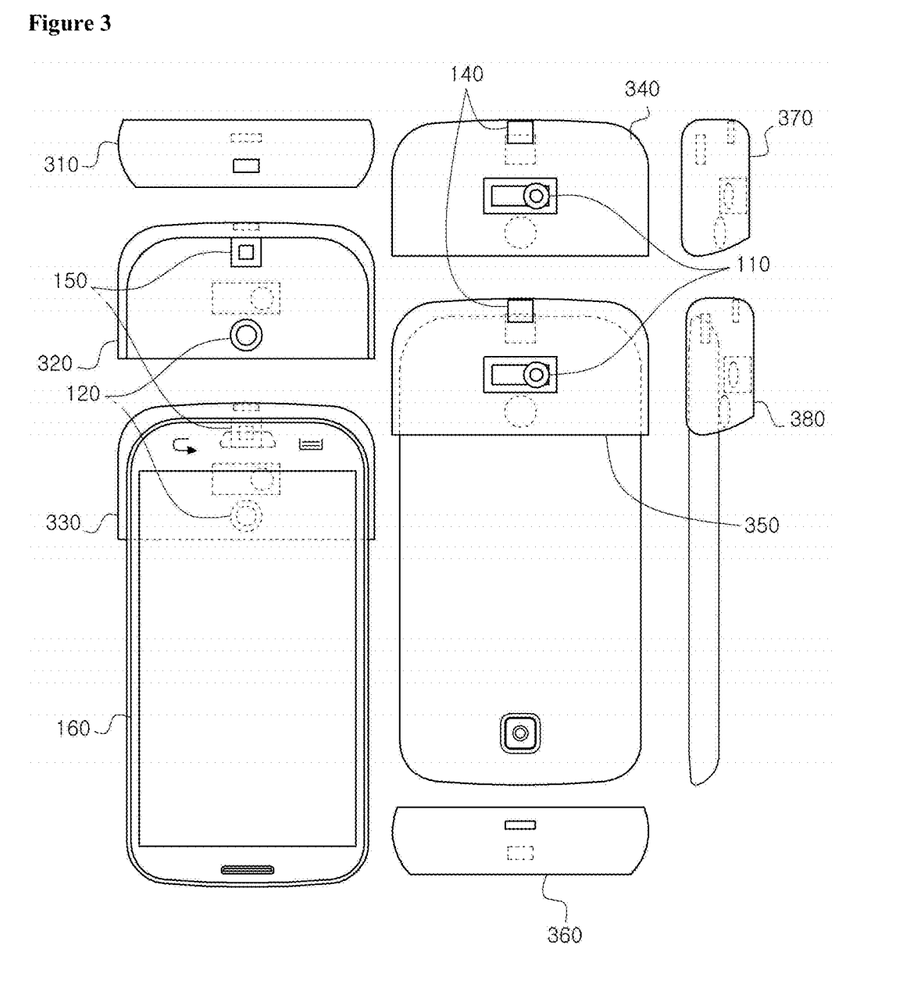
FIG. 3 shows a smart mouse device according to one embodiment of the present invention when connected to a user terminal.

FIG. 3 shows a smart mouse device according to one embodiment of the present invention when connected to a user terminal.

FIG. 3 shows a plan view 310 of the smart mouse device according to one embodiment, a front view 320 before the smart mouse device is coupled to the user terminal 160, a front view 330 after the smart mouse device is coupled to the user terminal 160, a rear view 340 before coupling, a rear view 350 after coupling, a bottom view 360, a side view 370 before coupling, and a side view 380 after coupling. A user terminal connection unit 140 has a connection terminal inside the smart mouse device and is thus connected to a user terminal 160 when the smart mouse device is connected to the user terminal 160. The user terminal connection unit 140 has an OTG function and thus directly exchanges data with the user terminal when connected to the user terminal. A device connection unit 150 may be provided with a connection terminal outside the smart mouse device for connection with a computer terminal or the like. An optical sensor 110 is disposed on a rear side of the smart mouse device and outputs position data based on movement of the user terminal 160 to which the smart mouse device is coupled. Further, a pressure sensor 120 is disposed on a front side of the smart mouse device and outputs a pressure signal and the like. The optical sensor 110 and the pressure sensor 120 are used to augment hardware of the user terminal 160. The position data and the pressure signal are transmitted to the user terminal 160 by a controller of the smart mouse device, and are also transmitted to a computer terminal through communication between the user terminal 160 and the computer terminal. When the smart mouse device is connected to the computer terminal through the device connection unit 150 without connection to the user terminal 160, the smart mouse device may be used as a basic mouse device.

Figure 4:
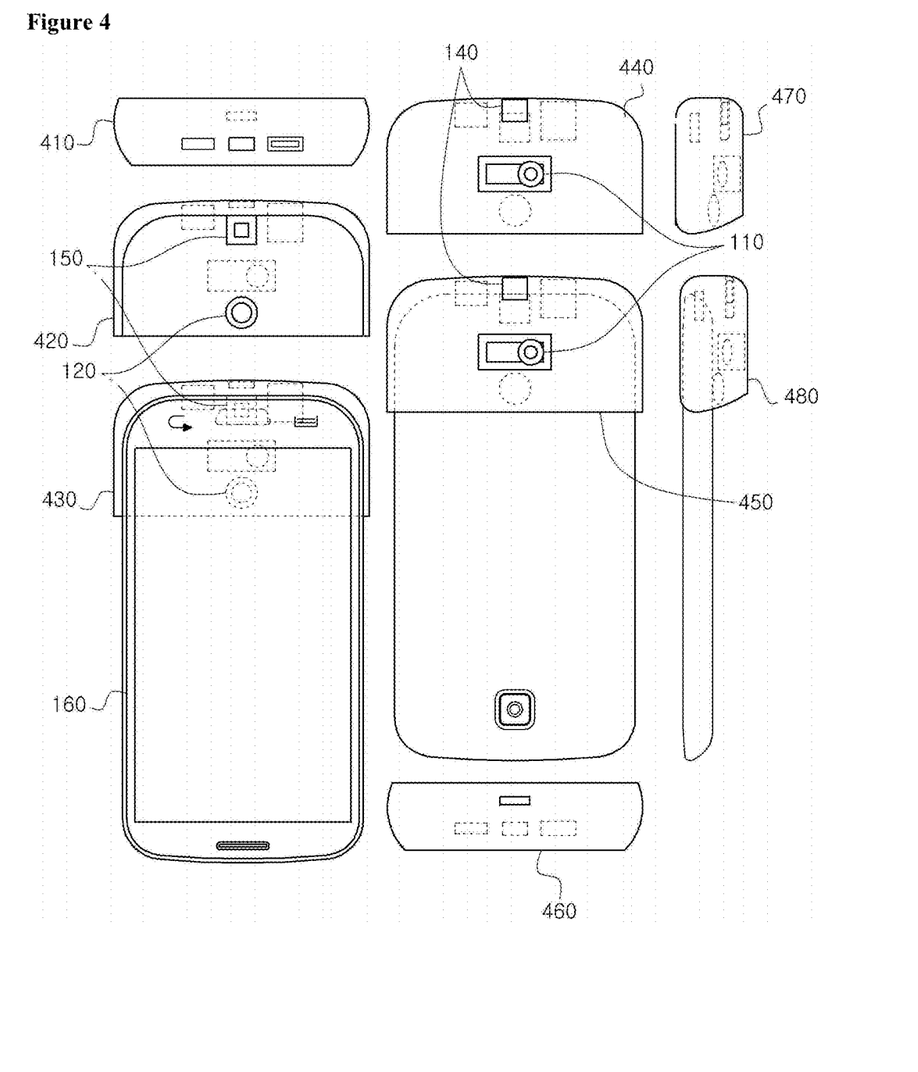
FIG. 4 shows a smart mouse device according to another embodiment of the present invention when connected to a user terminal.

FIG. 4 shows a smart mouse device according to another embodiment of the present invention when connected to a user terminal.

FIG. 4 shows an extended form of the smart mouse device of FIG. 3, which further includes an additional connection unit 491 and a memory connection unit 492. The additional connection unit 491 and the memory connection unit 492 have connection terminals outside the smart mouse device for connection with another device or memory. The additional connection unit 491 may be connected to devices that can exchange data with a controller of the smart mouse device, and the memory connection unit 492 may be connected to a memory such as an SD card. When the smart mouse device is connected to a computer terminal through a device connection unit 150 without connection with a user terminal 160 and the SD card is connected to the memory connection unit 492, the smart mouse device may be used as an SD card reader.

Figure 5:
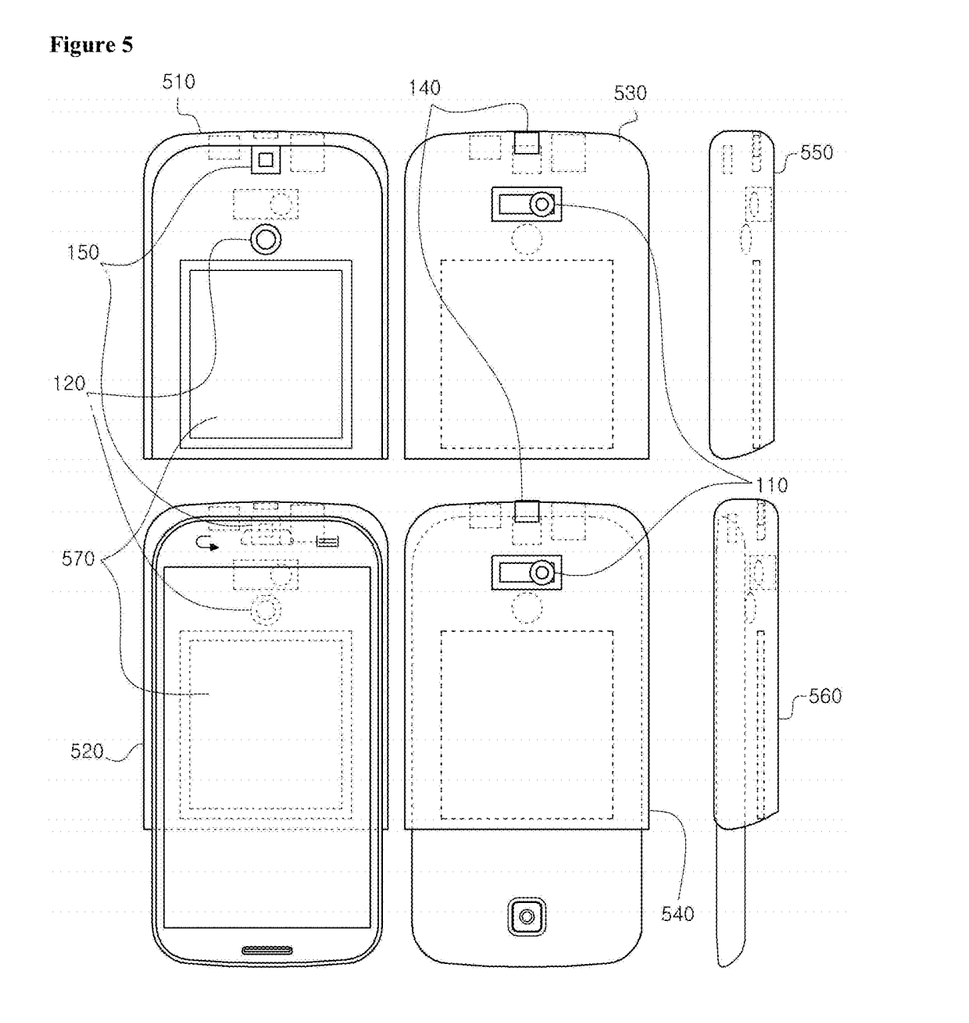
FIG. 5 shows a smart mouse device according to a further embodiment of the present invention when connected to a user terminal.

FIG. 5 shows a smart mouse device according to a further embodiment of the present invention when connected to a user terminal.

FIG. 5 shows an extended form of the smart mouse device of FIG. 4, which further includes a battery connection unit 570. An additional battery may be connected to a user terminal 160 through the battery connection unit 570, whereby the battery of the user terminal 160 can be increased in capacity or can be charged. An auxiliary battery for the user terminal 160 may be connected to the battery connection unit 570 to increase battery capacity. Further, if a charger is connected to a device connection unit 150, both the battery of the user terminal 160 and the auxiliary battery may be charged at the same time. When the smart mouse device is connected to the charger through the device connection unit 150 without connection with the user terminal 160 and the battery is connected to the battery connection unit 570, the smart mouse device may be used as the charger for the battery.

In addition to the embodiments shown in FIGS. 3 to 5, various embodiments may be realized.

FIGS. 6a to 6e show mouse functions that may be realized by a user terminal.

More specifically, the pressure sensor and the button and touchscreen of the user terminal may be used to generate a signal corresponding to a click, operation of a mouse scroll wheel, operation of shortcut keys, enlargement, reduction, cancel, or a predetermined command Detailed descriptions about the use of the pressure sensor are the same as those about the pressure sensor 120 of FIG. 1, and thus repeated descriptions thereof will be omitted. Below, various functions that may be implemented through the user terminal will be described. Like a smartphone, the user terminal includes a touchscreen, a camera, and various sensors to provide various functions. Such a variety of functions may be implemented by an application program installed in the user terminal, or may be stored in a storage device of the smart mouse device and directly implemented without any separate application program by connecting the smart mouse device to the user terminal.

Figure 6A:
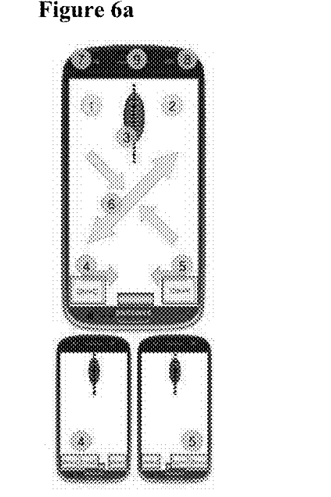
FIGS. 6a to 6e show mouse functions that may be realized by a user terminal.

FIG. 6a shows a basic mouse function, a copying function, an enlarging/reducing function, or a shortcut key function. ① shows a left click and ② shows a right click corresponding to pressure sensed based on a pressing operation. ③ shows operation of a mouse device wheel, which implements a scroll function when scrolled up or down, and implements a wheel click function when clicked while being pressed. ④ and ⑤ correspond to the shortcut key functions When the shortcut key is pulled leftward and rightward in ④ and ⑤, the shortcut key can be extended. ⑥ shows that a screen size is enlarged or reduced, or a font size of document to be edited is adjusted. The enlargement and reduction functions may be implemented by closing or opening two fingers for a desired job. ⑦ shows a cancel button of the user terminal and may be used to realize the cancel function. ⑧ shows a menu button of the user terminal and may be used to realize various setting functions. For example, the setting functions include left-handed setting, upward, downward, leftward and rightward movement, portrait or landscape screen control, gesture registration, screen pull-down, page shift, and the like. ⑨ shows a home button, which may be used to move to a home screen of the user terminal.

Figure 6B:
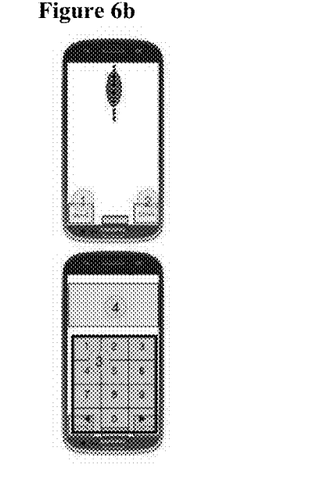

FIG. 6b shows copy and paste functions. ① shows a copy shortcut key and ② shows a paste shortcut key. After selecting an object to be copied, if ① is pressed short, the object is copied. Then, if ② is pressed short, the copied object is pasted. After selecting an object to be copied, if ① is pressed long, a numeral pad of ③ is displayed on a screen. If a numeral is selected on the displayed numeral pad, the copied object is stored in the corresponding numeral. Then, if ② is pressed long, the numeral pad is displayed again on the screen. When a numeral is selected on the displayed numeral pad, the copied object stored in the selected numeral is displayed on a screen of ④. When the screen of ④ is pressed, the copied object is pasted. If ◄ or ► is pressed, the numeral pad is moved such that more numerals can be selected. Various objects may be copied and pasted, thereby improving convenience and efficiency in copying operation.

Figure 6C:
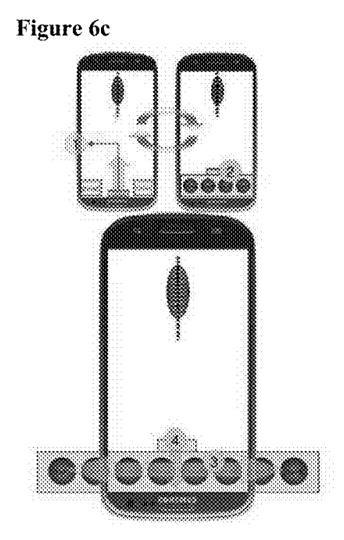

FIG. 6c shows a shortcut key function. If ① is pushed up, an icon bar slides upward as shown in ①. By pushing the icon bar leftward or rightward as shown in ③, more icons are displayed. If the icon bar is pulled down, as shown in ④, the icon bar disappears.

Figure 6D:
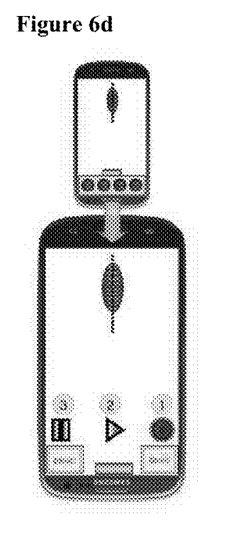

FIG. 6d shows an auto mouse function. The auto mouse function refers to a function of automatically implementing simple and repetitive jobs. If an auto mouse device is selected among the icons of FIG. 6c, the auto mouse function is executed. When a record button ① is clicked, recording starts and a red light flickers. After a operation to be repeated is performed once, if the recording button ① is clicked again, a blue light is turned on. If a start button ② is clicked, the recorded job is continuously repeated. During repetition, if a pause button ③ is clicked, the job is paused. Further, a frequently repeated job may be stored as an icon to be easily executed when needed.

Figure 6E:
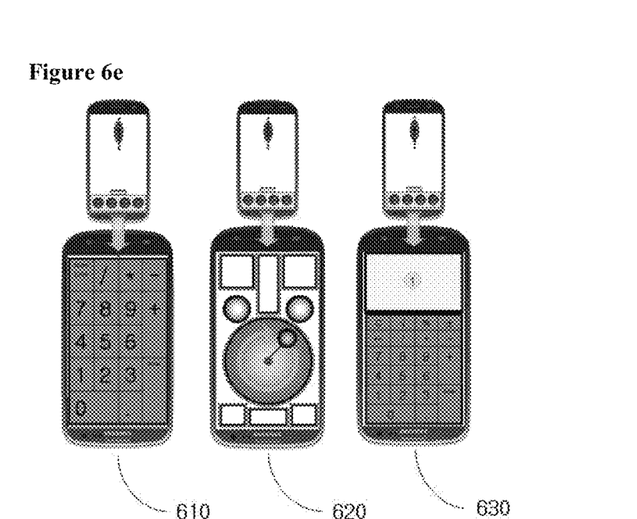

FIG. 6e shows functions that may be used through various icons. For example, various functions such as settings, a numeral pad 610, jog & shuttle 620, a calculator 630, a voice input for a text, loading pictures from a smartphone, loading an Internet scrap from the smartphone, loading a memo note from the smartphone, vibration on/off, a tablet mode, adjustment of mouse sensitivity (i.e. dots per inch (DPI)), and the like may be stored and executed through the icons.

If an icon for the numeral pad 610 is selected, a USB numeral pad of a notebook or a smart pad may be replaced by the numeral pad 610. If an icon for the jog & shuttle is selected, a jog & shuttle media editor is executed. Thus, an editing system for precisely editing a moving picture may be inexpensively used without a jog & shuttle device. When a dial of the jog & shuttle media editor is rotated, an editor function may be realized to provide vibration, sound and other effects. If an icon for the calculator 630 is selected, the calculator 630 is displayed on a screen. A calculation result is displayed on a screen ① and thus the calculation result is directly inserted into a document or a desired place by clicking the screen ①. After selecting a place into which a picture will be inserted, if a picture is photographed by a camera of the user terminal through selection of the camera icon, the picture is directly inserted into the selected place.

In addition, a screen of a computer terminal may be fully or partially selected and captured, and then stored in a user terminal. Further, a document, a picture, a moving picture, and the like of the computer terminal may be directly stored in the user terminal. In addition, a document, a picture, a moving picture, and the like of the computer terminal may be stored in a cloud server by connecting a cloud service connected to the user terminal, and it is also possible to download data of the cloud server. A recently edited document, a photo editor, editing of a moving picture, web search, and the like may be directly downloaded to another place or another computer terminal for operation. Further, authentication data stored in the user terminal may be used for auto-login and auto-authentication to a desired site in the computer terminal such that e-mail, social network service (SNS), financial payment, and other jobs may be obtained without separate login.

Figure 7:
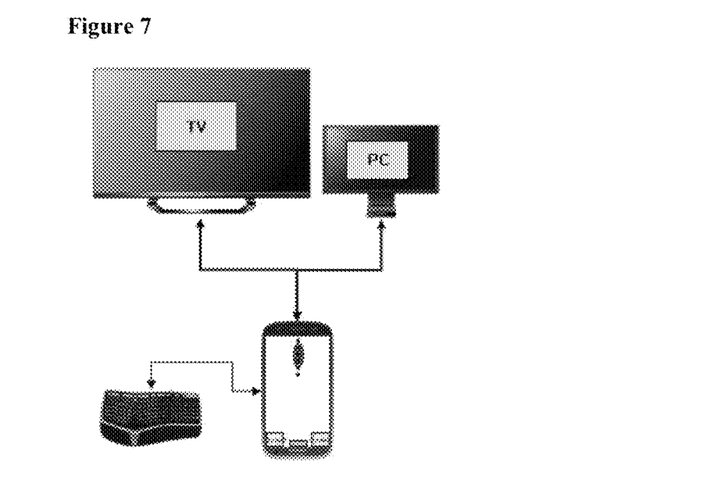
FIG. 7 shows a smart mouse device according to another embodiment of the present invention.

FIG. 7 shows a smart mouse device according to another embodiment of the present invention.

The smart mouse device according to this embodiment of the invention is connected to a display such as a TV, a monitor, and the like by wire or wirelessly, such that a document, a web page or the like can be displayed as an image on the display. Further, the smart mouse device may be connected to an input device such as a keyboard through an additional connection unit. The input device may be connected by wire or wirelessly, and a Bluetooth keyboard may be also used. A job to be implemented in the user terminal connected to the smart mouse device may be output to the display, and a user may implement the job using the input device and the user terminal connected to the smart mouse device while viewing an image displayed on the display. That is, if the user terminal is used as a mouse device, the display of the user terminal is used as an input unit for receiving a mouse signal and thus a job to be implemented in the user terminal cannot be viewed through the user terminal. Therefore, a display such as TV is connected to the smart mouse device such that a job to be implemented can be displayed, thereby improving convenience in implementation of the job through the input device and the user terminal.

In the user terminal according to embodiments of the invention, various functions may be realized in the form of program instructions which can be implemented through various computer components, and may be recorded in a computer-readable storage medium. The computer-readable storage medium may include a program instruction, a local data file, a local data structure, and the like either alone or in combination thereof. The program instruction recorded in the computer-readable storage medium may be any program instruction particularly designed and structured for embodiments of the present invention or known to those skilled in the field of computer software. Examples of the computer-readable storage medium include magnetic recording media such as hard disks, floppy disks and magnetic tapes, optical data storage media such as CD-ROMs or DVD-ROMs, magneto-optical media such as floptical disks, and hardware devices, such as a read-only memory (ROM), random-access memory (RAM) and flash memory, which are particularly structured to store and implement the program instruction. Examples of the program instruction include not only machine language code formatted by a compiler but also high level language code which can be executed by a computer using an interpreter. The hardware devices may be configured to be operated by one or more software modules or vice versa to perform the processes according to embodiments of the present invention.

Although some embodiments have been described herein, it should be understood by those skilled in the art that these embodiments are given by way of illustration only, and that various modifications, variations, and alterations can be made without departing from the spirit and scope of the invention.

Therefore, the scope of the present invention should be limited only by the accompanying claims and equivalents thereof.

LIST OF REFERENCE NUMERALS

100: Smart mouse device
110: Optical sensor
120: Pressure sensor
130: Controller
140: User terminal connection unit
150: Device connection unit
160: User terminal
170: Computer terminal
210: Embedded battery
220: Additional connection unit
230: Battery connection unit
240: Memory connection unit
250: Computer terminal or charger

The invention claimed is:
1. A smart mouse device comprising:
an optical sensor outputting position data based on light emitted from a light emitting diode and reflected;
a pressure sensor placed under a user terminal and outputting a pressure signal when the user terminal is pressed;

a controller transmitting the position data and the pressure signal to the user terminal; and a user terminal connection unit connected to the user terminal to exchange data with the user terminal, wherein the pressure signal is used to determine whether the user terminal generates a mouse signal.

2. The smart mouse device according to claim 1, wherein the user terminal connection unit has an on-the-go (OTG) function.

3. The smart mouse device according to claim 1, further comprising:

a device connection unit connected to an external terminal to exchange data with the external terminal.

4. The smart mouse device according to claim 3, wherein the controller relays communication between the user terminal and the external terminal through the user terminal connection unit and the device connection unit.

5. The smart mouse device according to claim 3, wherein the device connection unit is connected to a charger, or connected to a device capable of exchanging data with the user terminal through the controller.

6. The smart mouse device according to claim 1, wherein the position data and pressure signal transmitted to the user terminal are transmitted from the user terminal to an external terminal together with the mouse signal generated from the user terminal, and the mouse signal generated from the user terminal are generated by a button and a touchscreen of the user terminal.

7. The smart mouse device according to claim 6, wherein the pressure sensor outputs the pressure signal when pressure is constantly sensed for a predetermined period of time.

8. The smart mouse device according to claim 1, further comprising:

an additional connection unit to which a device capable of exchanging data with the controller is connectable.

9. The smart mouse device according to claim 1, further comprising:

a memory connection unit to which a memory is connectable.

10. The smart mouse device according to claim 1, further comprising:

a battery connection unit to which a battery of the user terminal is connected, wherein the battery connection unit enables connection of an additional battery to the user terminal therethrough to increase capacity of the battery of the user terminal or to charge the battery of the user terminal.

11. The smart mouse device according to claim 1, further comprising:

an embedded battery usable as an emergency power source for the user terminal.

12. The smart mouse device according to claim 1, wherein the pressure sensor and a button and a touchscreen of the user terminal are used to output a signal corresponding to one among a click, operation of a mouse device wheel, a shortcut key, enlargement, reduction, cancel, and a predetermined command.

13. The smart mouse device according to claim 1, wherein the pressure sensor determines that the mouse signal is generated when pressure greater than or equal to a critical pressure is sensed.

14. The smart mouse device according to claim 1, wherein the user terminal is connected to a display device by wire or wirelessly such that a job to be implemented in the user terminal can be displayed on the display device and implemented using the mouse signal generated from the user terminal.

15. A computer terminal or charger having the smart mouse device according to claim 1.

* * * * *